Dec. 28, 1937.  J. GOLDSMITH  2,103,971
ENCLOSED DRIVE FOR PUMPS
Filed Oct. 8, 1936
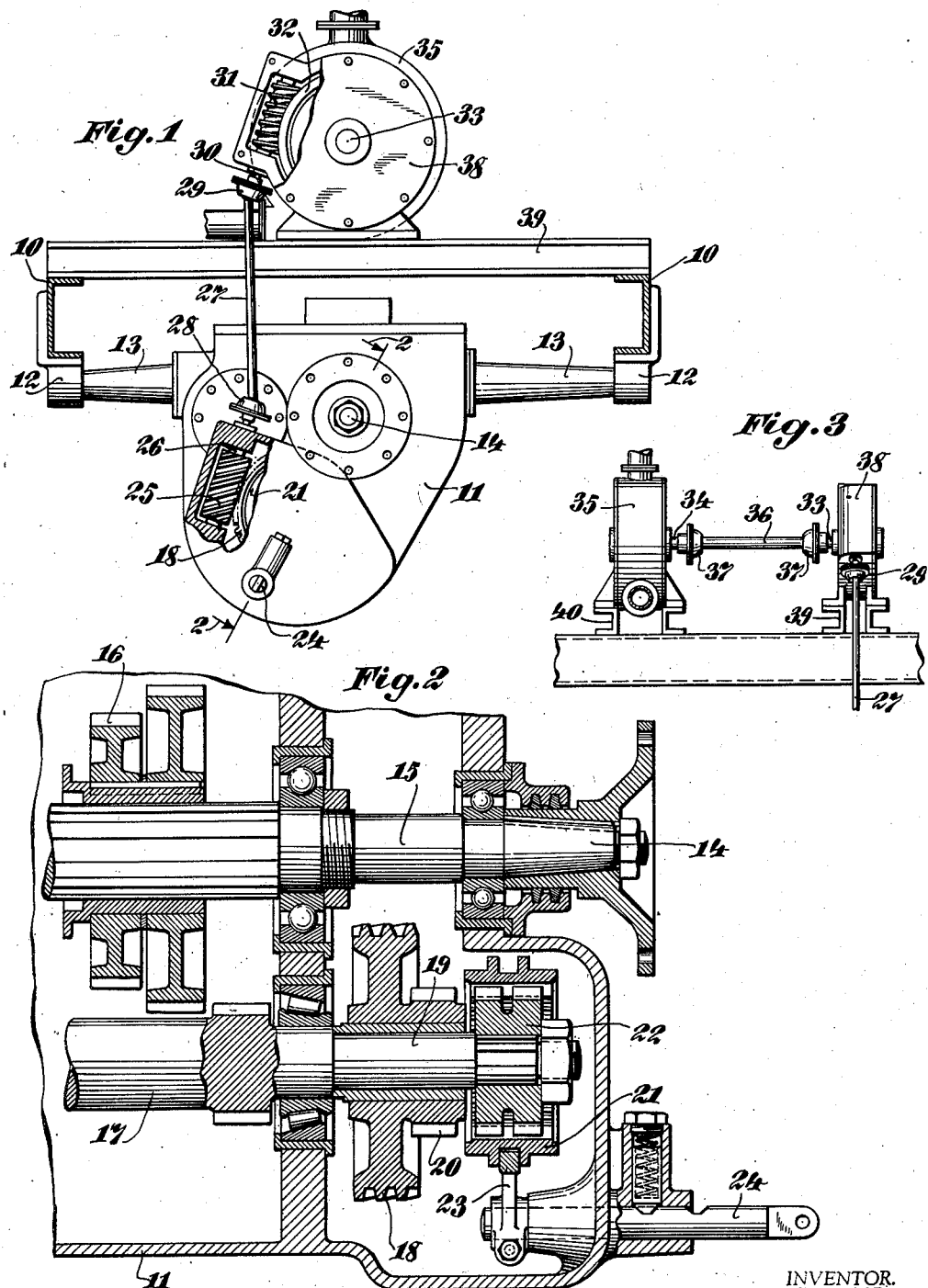
INVENTOR.
John Goldsmith,
BY Hoguet, Neary & Campbell,
HIS ATTORNEYS Patented Dec. 28, 1937

2,103,971

UNITED STATES PATENT OFFICE 2,103,971

ENCLOSED DRIVE FOR PUMPS

John Goldsmith, Sunnyside, N. Y., assignor to Mack Manufacturing Corporation, a corporation of Delaware Application October 8, 1936, Serial No. 104,590

2 Claims. (Cl. 74—11)

The present invention relates to drives for pump mechanisms mounted upon a vehicle frame and embodies, more specifically, an improved form of drive wherein the mechanism for an over-speed connection which is provided in the usual form of five speed transmission mechanisms now available is utilized in combination with associated drive elements for driving pump mechanism carried by the vehicle.

Considerable difficulty has heretofore been encountered in providing an effective drive mechanism for pumps such as flusher pumps used in connection with equipment designed for sanitation departments. In order that the apparatus may be mobile, it is obviously desirable to mount the same upon the vehicle frame and yet, because of the design of existing vehicle drive mechanisms, the operation of equipment of this character has been a difficult problem. Not only must the device be mobile, but it must be flexible in operation or, in other words, it must be available and operative whether the chassis is moved, driven or stationary.

In order that such construction may be provided, the present invention has been designed and an object of the invention, accordingly, is to provide a drive of the above character which is operable regardless of the condition of operation of the chassis upon which it is mounted, the drive being of simple construction and yet effective in all operating conditions.

Further objects of the invention will be apparent as it is described in connection with the accompanying drawing, wherein Figure 1 is a view in transverse section, taken through a vehicle chassis constructed in accordance with the present invention, and showing the drive mechanism in end elevation;

Figure 2 is a view in section, taken on line 2—2 of Figure 1, and looking in the direction of the arrows; and Figure 3 is a view in side elevation of the mechanism constructed in accordance with the present invention.

With reference to the above drawing, 10 indicates the side channels of the vehicle frame upon which a transmission mechanism 11 is mounted by means of brackets 12 and arms 13. The transmission 11 is of the conventional five speed type provided with an over-speed connection. In accordance with the present invention, and as shown in Figure 2, the driven shaft 14 of the transmission mechanism which has heretofore been provided with a shaft section 15 upon which one of the gears of an over-speed gear train is mounted is journaled within the transmission housing and provided with the usual shiftable gears some of which are shown at 16. The shaft section 15, however, is not provided with any over-speed gear element. The countershaft 17 of the transmission, instead of being provided with the usual over-speed gear elements, is provided with a power take-off worm 18, mounted upon the overhanging portion 19 of shaft 17. This worm 18 is journaled upon the extension 19 of shaft 17 and is provided with a clutch element 20 which is adapted to be engaged by a sliding clutch element 21, which cooperates with a stationary clutch element 22, secured to and movable with the shaft section 19. A fork 23 is provided for moving the sleeve 21 axially, a shifter shaft 24 being provided in order that this operation may be effected conveniently.

Cooperating with the worm 18 is a worm gear 25, carried by a shaft 26 which is journaled within the housing 11. Shaft 26 is connected to a shaft 27 through a universal connection 28, shaft 27 being connected at its other end to a universal connection 29 which in turn is connected to a shaft 30 upon which a worm 31 is mounted. Worm 31 cooperates with a worm wheel 32 in order that power may be supplied to a drive shaft 33, connected to the drive shaft 34 of a flusher pump 35 by means of shaft section 36 and universal connections 37. Gears 31 and 32 are preferably mounted within a housing 38 which is mounted upon the chassis by means of cross frame members 39, while the pump 35 is mounted upon the chassis by means of cross frame members 40.

As a result, it will be seen that the entire apparatus is mounted upon the vehicle frame 10 and is adapted for operation regardless of the condition of the operation of the chassis. Moreover, the drive elements are simple in construction and effective in operation, the elements of the drive being effectively enclosed and so carried by the vehicle frame as to afford a rugged and serviceable mechanism.

I claim:

1. In combination with a vehicle chassis having a power unit and transmission mechanism thereon having a main and countershaft supporting partition and an overhanging extremity on the countershaft which provides for an over-speed gear connection thereon between a countershaft and the transmission driven shaft, mechanism mounted on the frame to be driven by the power unit, a gear in the transmission mechanism rotatably mounted on the overhanging extremity on the countershaft provided for an over-speed connection, a clutch between the said extremity on the countershaft and the gear, a gear housing and gears mounted on the frame, a permanent drive connection between the mechanism to be driven and the gears in the last named gear housing, and a permanent drive connection between the gears in the last named gear housing and the gear mounted rotatably on the overhanging extremity on countershaft.

2. In combination with a vehicle chassis having a power unit and transmission mechanism thereon having provision for an over-speed gear connection thereon between a countershaft and the transmission driven shaft, mechanism comprising a pump mounted on the frame to be driven by the power unit, a gear in the transmission mechanism rotatably mounted on the portion of the countershaft provided for an over-speed connection, a clutch between the last named portion of the countershaft and the gear, a gear housing and gears mounted on the frame above the transmission mechanism, a vertically extending shaft, universal connections between the ends of the last named shaft and the said respective gears, a horizontally disposed power shaft on the frame and universal connections between the last named shaft and the pump and gears in the gear housing respectively.

JOHN GOLDSMITH.